Aug. 15, 1944.    L. M. PIDGEON ET AL    2,356,118
PRODUCTION OF ANHYDROUS MAGNESIUM CHLORIDE
Filed Feb. 17, 1941
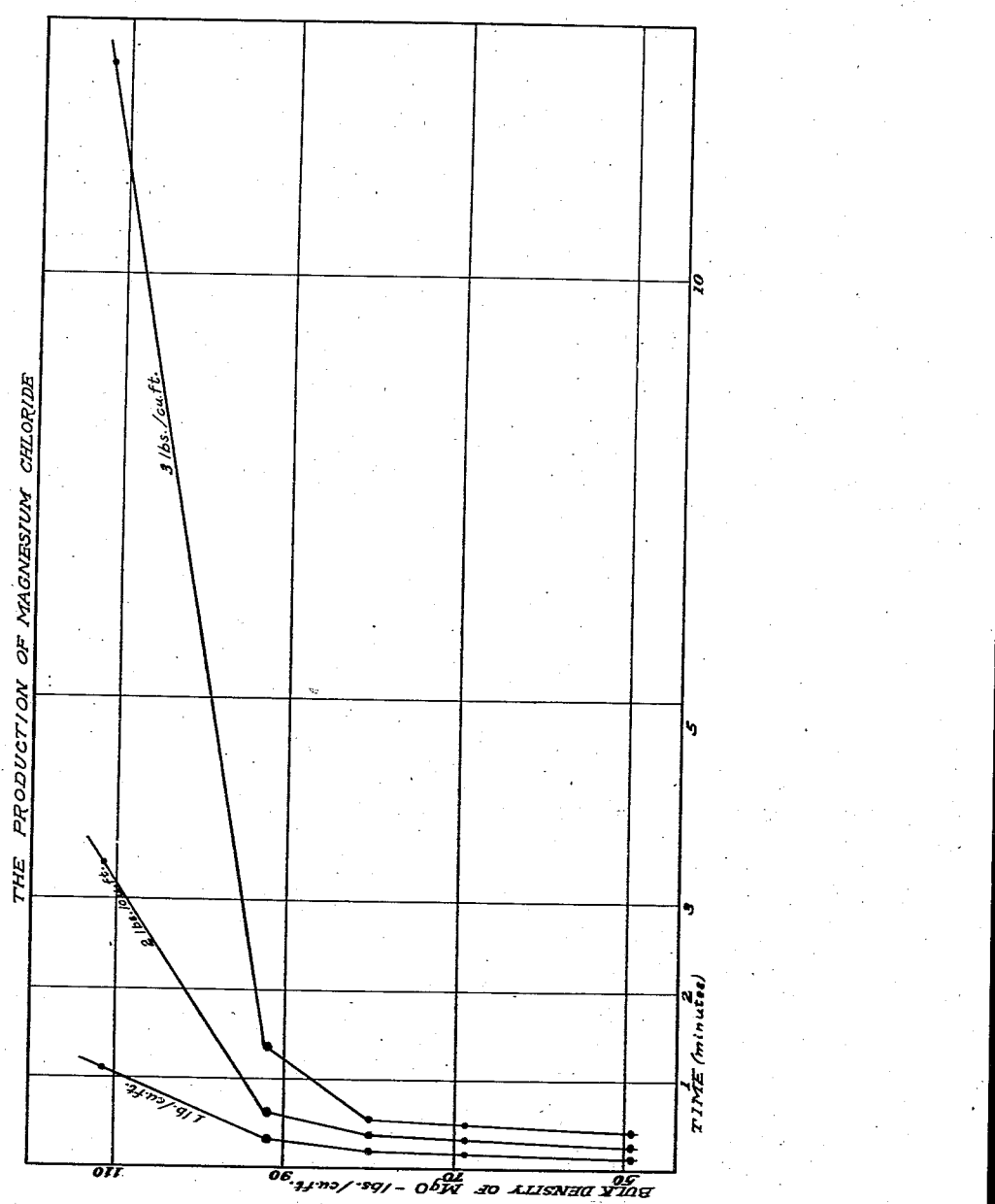
INVENTORS:
L. M. PIDGEON and N. W. F. PHILLIPS
BY
ATTORNEY.

Patented Aug. 15, 1944

2,356,118

UNITED STATES PATENT OFFICE 2,356,118

PRODUCTION OF ANHYDROUS MAGNESIUM CHLORIDE

Lloyd Montgomery Pidgeon, Rockcliffe Park, Ontario, and Norman William Frederick Phillips, Ottawa, Ontario, Canada, assignors to The Honorary Advisory Council for Scientific and Industrial Research, Ottawa, Ontario, Canada, a corporation of the Dominion of Canada Application February 17, 1941, Serial No. 379,254 In Canada April 3, 1940

3 Claims. (Cl. 23—91)

This invention relates to the production of anhydrous magnesium chloride and is particularly directed to improvement in already well known and presently used methods with a view to economy and greater purity of the product.

The rapidly increasing industrial application of the metal magnesium renders it increasingly important to provide the most highly efficient methods for the production of the metal. The formation of magnesium chloride is usually involved in the production of the metal magnesium itself. In producing the chloride a mixture of magnesia or magnesite and carbon, coke or the like is normally formed into briquettes which are dried and calcined to drive off the carbon dioxide from the magnesium carbonate, after which the briquettes are subjected, on a bed of unreactive and electrically conducting carbon in a furnace, to the action of chlorine gas introduced at the bottom of the furnace which is maintained at a temperature of 800 to 1000° C. Molten anhydrous magnesium chloride is tapped off at the bottom of the furnace. It has also been proposed to subject a loose mixture of magnesite or magnesium hydroxide to a similar chlorinating treatment.

These methods have disadvantages from the point of view of both economy of operation and purity of the product. In the briquetting method, magnesium chloride, and magnesia in an active form, are used as a binder for the magnesite and carbon. The provision of this binder and the loss of the chlorine therein upon calcination adds greatly to the cost of the operation. The reaction is endothermic and a substantial amount of heat is lost. If preliminary briquetting is not employed, endothermic decomposition in the chlorination furnace leads to substantial losses of heat where it is most needed. The product of heating raw magnesite in a chlorinating furnace is powdry magnesia, which contaminates the fused magnesium chloride, and at the same time the finely divided material has the tendency to obstruct efficient and complete chlorination of the magnesia. The use of magnesium hydroxide as the raw material is prohibitive owing to heavy losses of chlorine. Dead burned magnesite is dense and contains considerable iron and aluminium, which would be volatilized as chlorides, thus resulting in heavy losses of chlorine. Periclase, produced by sintering or fusion without iron or similar dead-burning agent, is extremely dense and therefore of relatively low reactivity, as well as too expensive for economical operation.

The object of the present invention is to overcome these difficulties and to provide a method of producing substantially pure anhydrous magnesium chloride in an economical manner. It has been found that the density and character of the magnesia particles is an important consideration. If the particles are friable they tend to break up in the chlorinator and the material passes as oxide into the anhydrous magnesium chloride. On the other hand, magnesia particles of high density are inert chemically and conversion to the chloride is too slow to be economical. The specific gravity of pure magnesia is substantially 3.5. In practice applicants have found that the magnesia should be in the form of discrete particles having an apparent density not more than 2.5 and weighing not more than 85 lbs. per cu. ft., and that the particles should be substantially free from metals forming volatile chlorides, such as iron, aluminium, manganese and titanium. They should also be substantially free from silica, which tends to accumulate in the chlorinator. When the density is low the material is normally quite reactive and corresponding larger particles may be used without reducing the total surface area below the point at which rapid chlorination can be effected. Thus with a material of a density of 1.5 particles up to 4 or 5 mm. in diameter may be used, whereas if the density is 2.5 it is preferable to have particles not more than 1.0 to 1.5 mm. in diameter. The minimum size in either case is determined by the porosity of the mass which is necessary in order to permit the chlorine to pass readily through it and the liquid magnesium chloride to drain away as it is formed. The minimum size for commercial use is substantially 1.0 mm. in diameter.

In carrying out the invention discrete particles of magnesium oxide substantially 1.0 mm. in diameter or larger and having an apparent density of not more than 2.5 and preferably a bulk density of substantially 50 to 85 lbs. per cu. ft. are uniformly mixed with reactive carbon particles. The carbon used for reduction may be coke or other reactive carbon suitably sized, with at least a portion of it the same size as the particles of magnesium oxide. The mixture having a bulk density of preferably not more than about 70 lbs. per cu. ft. is placed in a furnace upon a shallow bed of coke. The furnace is raised to a temperature of about 1000° C. by electric current flowing through electrodes projecting into the bed of coke and chlorine gas is passed upwardly through the charge from tuyères located in the region of the bed of coke in the usual way. During the introduction of chlorine the temperature is maintained at 800 to 1100° C. and as magnesium chloride is formed it runs to the bottom of the furnace from whence it may be tapped out. The mixture of discrete particles of magnesium oxide and carbon is charged to the top of the furnace, maintaining a substantial depth thereof so that chlorine not combined in the high temperature zone is consumed in the lower temperature regions, thus insuring high chlorine efficiency.

In the accompanying drawing there is disclosed a chart showing the rate of production of magnesium chloride from particles of varying densities and −2.362+1.168 millimeters in size. The temperature employed was 800° C. The bulk density is plotted against the time required to produce different quantities of magnesium chloride per cubic foot of the mixture of magnesium oxide particles and carbon.

Porosity in the discrete particles of magnesium oxide facilitates and hastens the reduction of the oxide and the complete chlorination of the magnesia so that there is no contamination of the fused magnesium chloride with unreacted magnesium oxide. It is thus apparent that the physical character of the particles of magnesium oxide is an important consideration in insuring efficiency of operation and the purity of the magnesium chloride produced. Such discrete particles may be produced, for example, by the method disclosed in United States Patent No. 2,208,185.

A substantial proportion of very fine carbon or coke should be avoided since the rate of the furnace reaction is reduced consequent upon lowered chlorine gas flow through the charge. Carbon somewhat coarser than the discrete low density particles of magnesium oxide has been found satisfactory.

"Apparent density" as used herein is determined by the formula $$\frac{W}{V_1+V_2}$$

where W is the weight of the discrete particle in grams, $V_1$ the volume occupied by the solids in the particle and $V_2$ the volume occupied by the pores in the particle in c. c.'s.

We claim:

1. In the production of anhydrous magnesium chloride the method which comprises passing chlorine through a heated mass of particles of carbon and discrete particles of magnesium oxide, the latter particles having an apparent density not more than 2.5 nor less than 1.5, a bulk density of not more than substantially 85 lbs. per cubic foot and a diameter of not less than substantially 1.0 millimeter and being free to move relatively to the carbon particles.

2. In the production of anhydrous magnesium chloride the method which comprises passing chlorine gas upwardly through a mass of non-friable particles of magnesium oxide having an apparent density not more than 2.5 nor less than 1.5 and a diameter of 1 to 5 millimeters uniformly loosely dispersed with and free to move in relation to particles of carbon of substantially the same size as the particles of magnesium oxide, heating the mass to a temperature of 800–1100° C. and withdrawing downwardly of the mass liquid anhydrous magnesium chloride.

3. In the production of anhydrous magnesium chloride the method which comprises charging a furnace with discrete particles of magnesium oxide having an apparent density of not more than substantially 2.5 and a bulk density of 50 to 85 lbs. per cubic foot and particles of reactive carbon, the particles of magnesium oxide being free to move relatively to each other and to the carbon particles maintaining a temperature of 800 to 1100° C. in the reaction zone, passing chlorine gas upwardly through the mass and withdrawing substantially pure fused magnesium chloride at the bottom of the furnace.

LLOYD MONTGOMERY PIDGEON.
NORMAN WILLIAM FREDERICK PHILLIPS.